(12) United States Patent
Horiguchi et al.

(10) Patent No.: US 11,686,603 B2
(45) Date of Patent: Jun. 27, 2023

(54) PRESSURE TYPE FLOWMETER AND FLUID CONTROL DEVICE

(71) Applicant: HORIBA STEC, Co., Ltd., Kyoto (JP)

(72) Inventors: Hiroshi Horiguchi, Kyoto (JP); Tadahiro Yasuda, Kyoto (JP); Kentaro Nagai, Kyoto (JP)

(73) Assignee: HORIBA STEC, Co., Ltd., Kyoto (JP)

(*) Notice: Subject to any disclaimer, the term of this patent is extended or adjusted under 35 U.S.C. 154(b) by 126 days.

(21) Appl. No.: 17/447,217

(22) Filed: Sep. 9, 2021

(65) Prior Publication Data

US 2022/0082416 A1 Mar. 17, 2022

(30) Foreign Application Priority Data

Sep. 11, 2020 (JP) .............................. JP2020-152571

(51) Int. Cl.
*G01F 1/42* (2006.01)
*G01F 1/12* (2006.01)
*F16J 15/06* (2006.01)

(52) U.S. Cl.
CPC ............... *G01F 1/12* (2013.01); *F16J 15/06* (2013.01)

(58) Field of Classification Search
CPC .......... G01F 1/42; G01F 15/005; G01F 1/363; G01F 1/34; G01F 1/586; F16J 15/06; G05D 7/0647; G05D 7/0641; G05D 7/06
See application file for complete search history.

(56) References Cited

U.S. PATENT DOCUMENTS

| 9,690,302 | B2* | 6/2017 | Yasuda | ............ | G01F 1/40 |
| 2015/0013792 | A1* | 1/2015 | Yasuda | ............ | G01F 1/40 |
| | | | | | 137/561 A |
| 2020/0208656 | A1* | 7/2020 | Horiguchi | ............ | G01F 1/36 |

FOREIGN PATENT DOCUMENTS

JP 2020107110 A 7/2020

\* cited by examiner

*Primary Examiner* — Freddie Kirkland, III
(74) *Attorney, Agent, or Firm* — Alleman Hall Creasman & Tuttle LLP (57) ABSTRACT

A pressure type flowmeter includes a fluid resistance element provided in a flow path through which fluid flows, and in which a resistance flow path communicating with the flow path is formed, an upstream-side pressure sensor that detects upstream-side pressure of the fluid resistance element, and a downstream-side pressure sensor that detects downstream-side pressure of the fluid resistance element, in which the fluid resistance element is sandwiched and fixed by a pair of sandwiching components sealing components having a sheet-like shape are provided between the fluid resistance element and the sandwiching components and protrusions that partially press the sealing components are formed on at least one of the fluid resistance element and the sandwiching components.

9 Claims, 5 Drawing Sheets

PRESSURE TYPE FLOWMETER AND FLUID CONTROL DEVICE

BACKGROUND

Technical Field

The present invention relates to a pressure type flowmeter and a fluid control device.

Related Art

As disclosed in JP 2020-107110 A, a fluid control device (Mass Flow Controller) using a conventional pressure type flowmeter is configured by stacking a plurality of thin plates as a fluid resistance element provided in a flow path. The fluid resistance element is sandwiched and fixed from the stacking direction thereof by a pair of sandwiching components.

Here, a sealing component having a sheet-like shape (for example, a thickness of 500 μm or less) is provided between the fluid resistance element and each of the pair of sandwiching components in order to prevent fluid leakage. Then, the sealing component having a sheet-like shape is pressed by the facing surfaces having a planar shape of the sandwiching component and the fluid resistance element to seal there between.

However, the sealing component having a sheet-like shape cannot be sufficiently pressed due to a thickness tolerance of the sealing component or a tolerance of the fluid resistance element or a block body, and a desired sealing performance may not be obtained. Note that it is conceivable to increase the force of pressing the sealing component having a sheet-like shape in order to improve the sealing performance, but in this case, the fluid resistance element would be deformed, and the flow rate characteristic of the fluid resistance element would change.

PRIOR ART DOCUMENT

Patent Document

Patent Document 1: JP 2020-107110 A

SUMMARY

The present invention has been made to solve the above problems, and a main object thereof is to improve the sealing performance by a sealing component having a sheet-like shape without adversely affecting the flow rate characteristic of a fluid resistance element.

That is, a pressure type flowmeter according to the present invention includes a fluid resistance element that is provided in a flow path through which fluid flows, and in which a resistance flow path communicating with the flow path is formed, an upstream-side pressure sensor configured to detect upstream-side pressure of the fluid resistance element, and a downstream-side pressure sensor configured to detect downstream-side pressure of the fluid resistance element, in which the fluid resistance element is sandwiched and fixed by a pair of sandwiching components, a sealing component having a sheet-like shape is provided between the fluid resistance element and the pair of sandwiching components, and a protrusion that partially presses the sealing component is formed on at least one of the fluid resistance element and the pair of sandwiching components.

In such a pressure type flowmeter, since a protrusion that partially presses the sealing component is formed on at least one of the fluid resistance element and the sandwiching component, the sealing performance can be improved by the protrusion biting into the sealing component. In addition, since the sealing component is partially pressed by the protrusion, a load applied to the fluid resistance element can be reduced, and a change in the flow rate characteristic due to deformation of the fluid resistance element can be suppressed.

Specifically, the fluid resistance element desirably includes a stack, in which the resistance flow path is formed in a direction intersecting a stacking direction of the stack, and the pair of sandwiching components are configured to desirably sandwich and fix the fluid resistance element from the stacking direction.

As a specific embodiment of the fluid resistance element, it is conceivable that in the fluid resistance element, a fluid inflow portion to which a starting end of the resistance flow path is open is formed in a central portion of the fluid resistance element when viewed from the stacking direction, and the resistance flow path extends from the fluid inflow portion toward an outer peripheral portion.

In this configuration, to improve sealing performance, the sealing component is desirably provided so as to surround the fluid inflow portion, and the protrusion is desirably formed so as to surround the fluid inflow portion.

To further improve the sealing performance, the protrusion is desirably a plurality of ridges having an annular shape formed so as to surround the fluid inflow portion. In this case, the plurality of ridges are provided concentrically.

On the other hand, in a case where a plurality of ridges are provided, there is a risk that gas is sealed between the ridges adjacent to each other at the time of assembling the pressure type flowmeter, and contamination may occur. To solve this problem, the protrusion is desirably one ridge having an annular shape formed so as to surround the fluid inflow portion.

To miniaturize the pressure type flowmeter, it is conceivable that the fluid inflow portion of the fluid resistance element is a through hole penetrating the fluid resistance element along the stacking direction, and the upstream-side pressure sensor detects the upstream-side pressure of the fluid resistance element through the through hole.

In this configuration, to simplify the fixing structure of the fluid resistance element, the pair of sandwiching components desirably includes a block body in which an upstream-side flow path communicating with the through hole is formed, and a fixing flange by which the upstream-side pressure sensor is fixed to the block body, and in which a detection communication path configured to detect pressure in communication with the through hole is formed.

To further improve the sealing performance, the sealing component is desirably provided between the fluid resistance element and each of the pair of sandwiching components. Here, in a case where the protrusion is formed in the fluid resistance element, processing cost thereof is required. Therefore, the protrusion is desirably formed on each of the pair of sandwiching components.

The sealing component is desirably made of a material having excellent corrosion resistance against fluid for long-term stability of the flowmeter, and is desirably made of, for example, a fluorine-based resin.

A fluid control device according to the present invention includes the above-described pressure type flowmeter and a fluid control valve provided on an upstream side or a downstream side of the pressure type flowmeter.

Further, a fluid control device according to the present invention includes the above-described pressure type flowmeter and a fluid control valve provided on an upstream side of the pressure type flowmeter, in which in the block body, the fluid control valve, the fluid resistance element, and the upstream-side pressure sensor are disposed in this order in one line along an advancing and retracting direction of a valve body of the fluid control valve.

With such a fluid control device, the internal volume can be reduced, and for example, responsiveness such as falling response performance can be improved.

According to the present invention described above, the sealing performance by the sealing component having a sheet-like shape can be improved without adversely affecting the flow rate characteristic of the fluid resistance element including the stack.

DETAILED DESCRIPTION

Hereinafter, a fluid control device (Mass Flow Controller) according to an embodiment of the present invention will be described with reference to the drawings.

<1. Overall Configuration>

Figure 1:
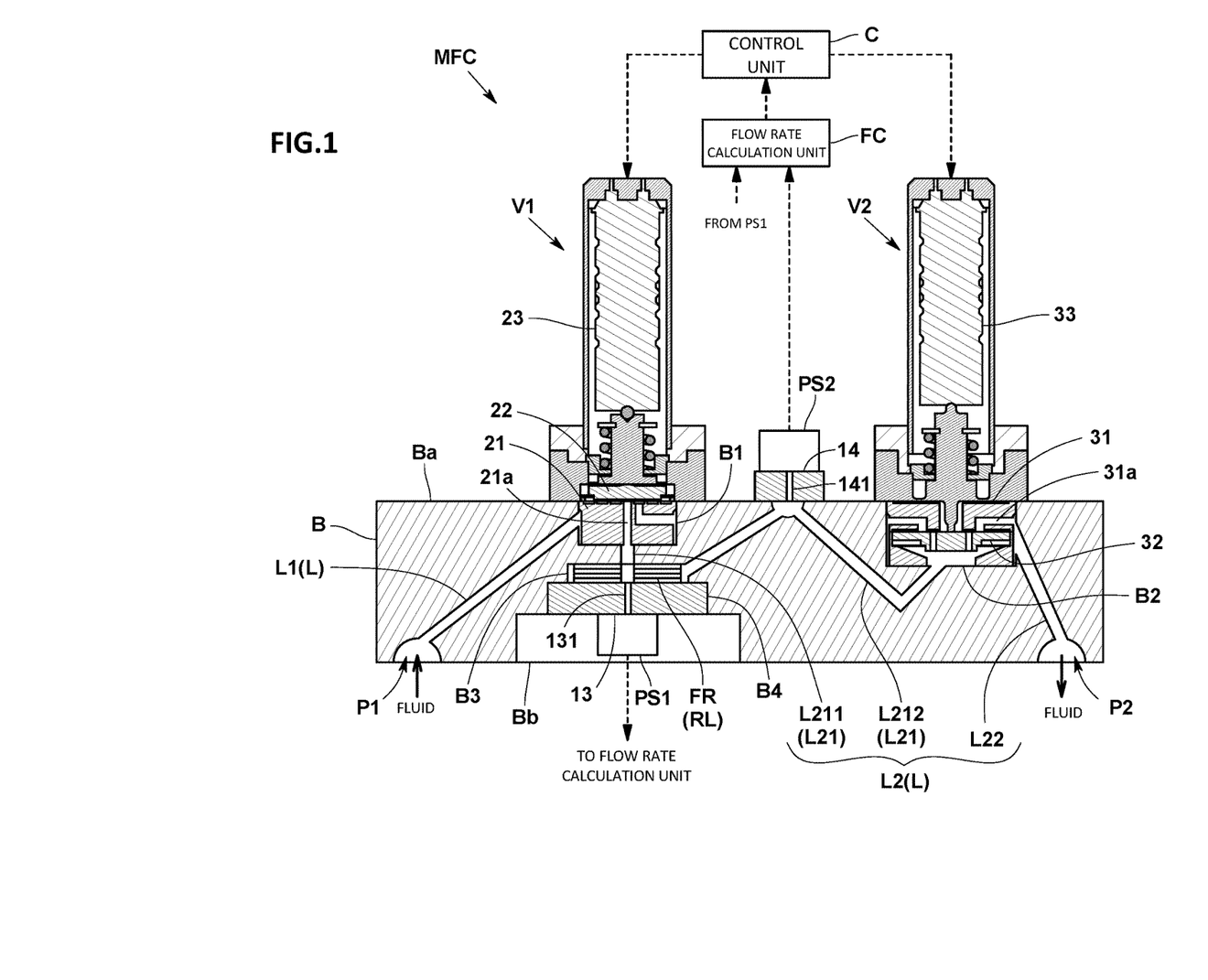
FIG. 1 is an overall schematic view of a fluid control device according to an embodiment of the present invention.

As illustrated in FIG. 1, a fluid control device MFC of the present embodiment is of a pressure type. Specifically, the fluid control device MFC includes a block body B in which a flow path L through which fluid flows is formed inside, a fluid resistance element FR provided in the flow path L of the block body B, an upstream-side pressure sensor PS1 provided in the block body B to detect upstream-side pressure of the fluid resistance element FR, a downstream-side pressure sensor PS2 provided in the block body B to detect downstream-side pressure of the fluid resistance element FR, a first fluid control valve V1 provided on the upstream side of the fluid resistance element FR in the flow path L of the block body B, and a control unit C that feedback-controls the first fluid control valve V1. In the present embodiment, the output signals of the upstream-side pressure sensor PS1 and the downstream-side pressure sensor PS2 are output to a flow rate calculation unit FC that calculates the flow rate value from the upstream-side pressure and the downstream-side pressure, and the flow rate value calculated by the flow rate calculation unit FC is output to the control unit C. The fluid control device MFC of the present embodiment further includes a second fluid control valve V2 provided on the downstream side of the downstream-side pressure sensor PS2 in the flow path L of the block body B, and has a configuration in which the second fluid control valve V2 is feedback-controlled by the control unit C.

The block body B has, for example, a rectangular parallelepiped shape. An inflow port P1 that introduces fluid is formed on one end side in the longitudinal direction of the block body B, and an outflow port P2 that discharges fluid is formed on the other end side in the longitudinal direction of the block body B.

In the block body B, a first housing portion B1 having a recessed shape for installing the first fluid control valve V1 is formed on a predetermined surface Ba (the upper surface in FIG. 1) of the block body B, and the flow path L is divided into an upstream-side flow path L1 and a downstream-side flow path L2 by the first housing portion B1. Here, in the first housing portion B1, one end of the upstream-side flow path L1 is open to the side surface of the first housing portion B1, and one end of the downstream-side flow path L2 is open to the bottom surface of the first housing portion B1.

Further, in the block body B, a second housing portion B2 having a recessed shape for installing the second fluid control valve V2 is formed on the predetermined surface Ba, and the downstream-side flow path L2 is divided into a first downstream-side flow path L21 and a second downstream-side flow path L22 by the second housing portion B2. Here, in the second housing portion B2, one end of the first downstream-side flow path L21 is open to the bottom surface of the second housing portion B2, and one end of the second downstream-side flow path L22 is open to the side surface of the second housing portion B2.

Figure 2:
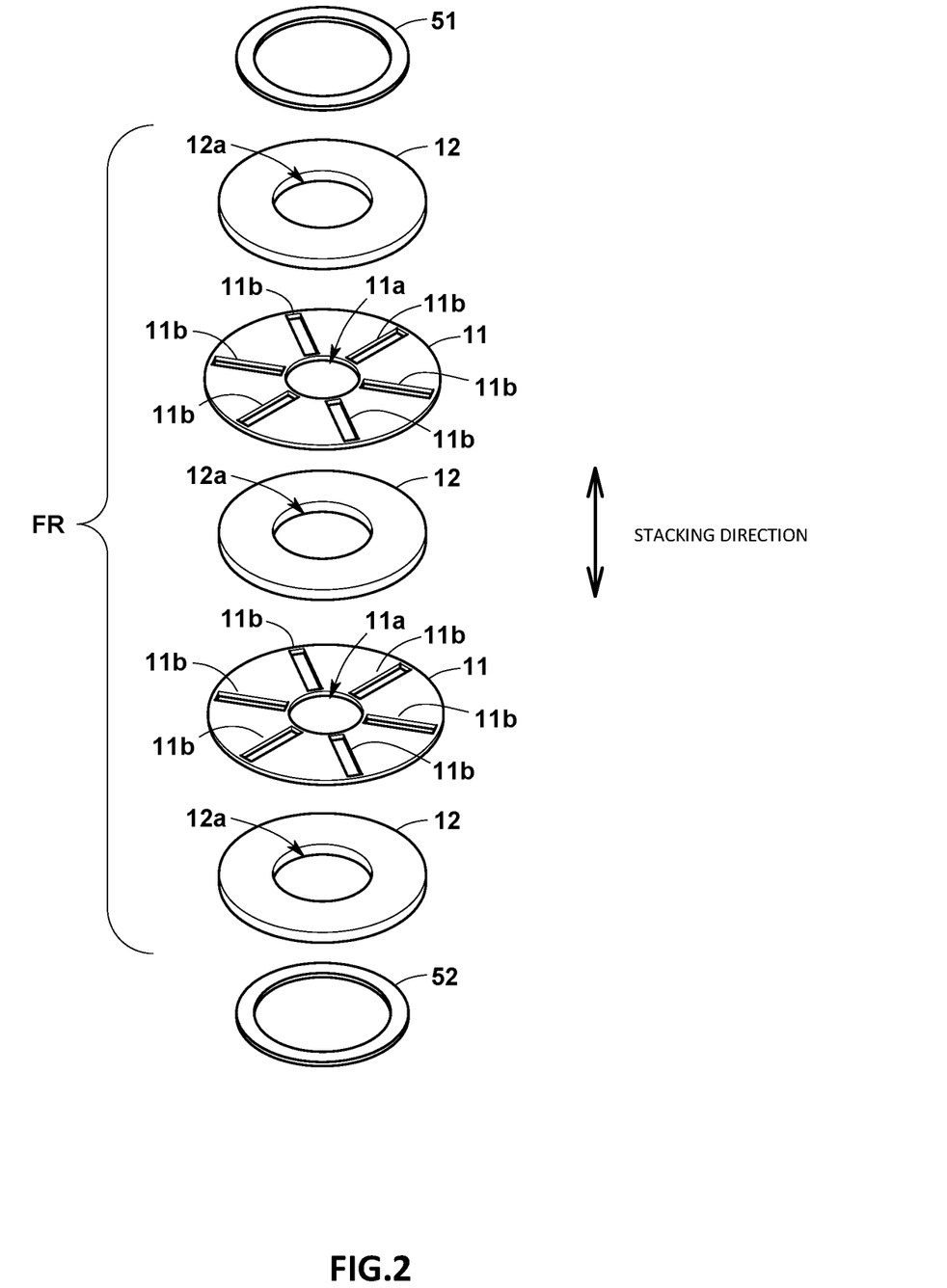
FIG. 2 is an exploded perspective view illustrating an example of the fluid resistance element of the embodiment.
Figure 3:
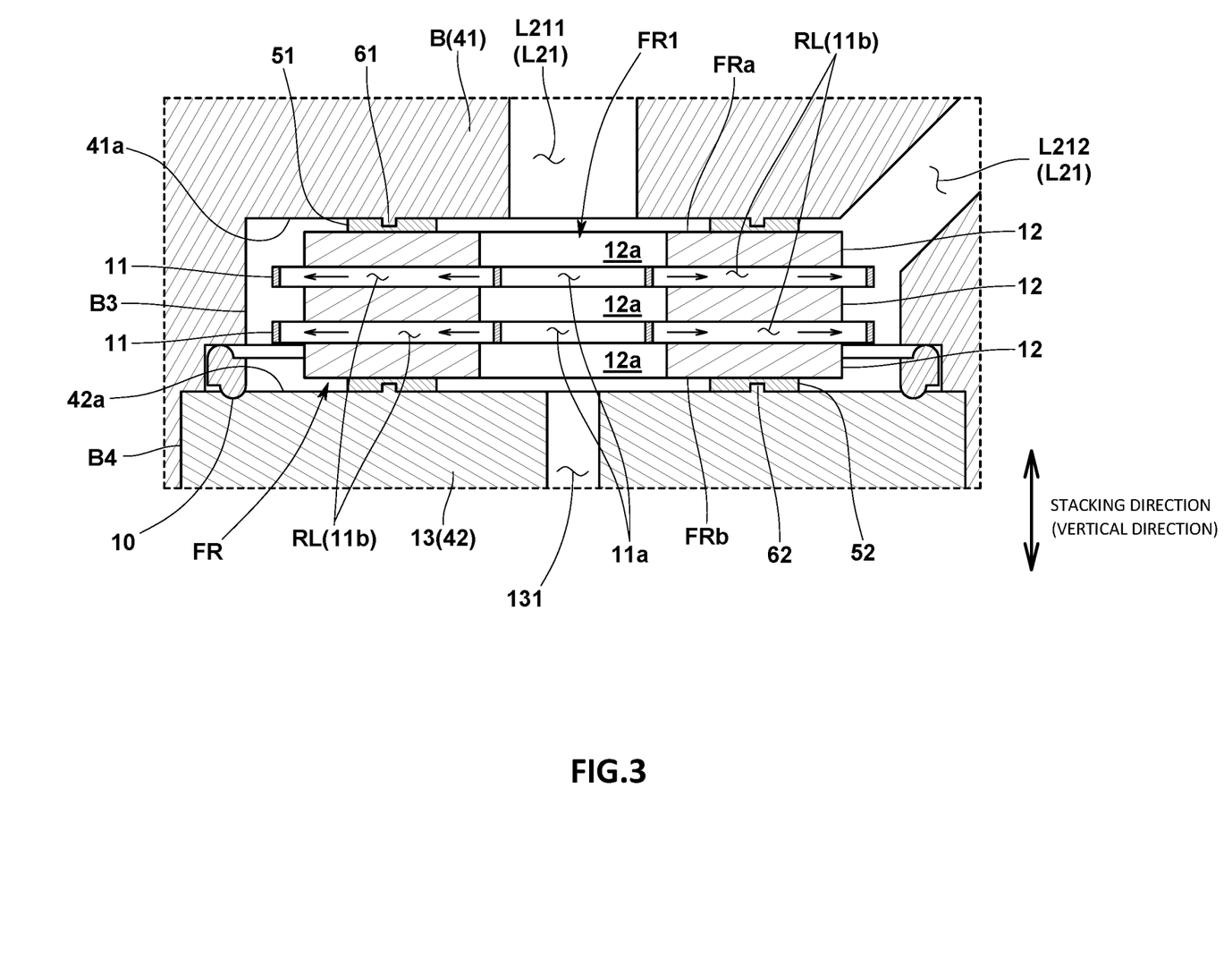
FIG. 3 is a partially enlarged cross-sectional view illustrating details of a sealing structure of the fluid resistance element of the embodiment.

As illustrated in FIGS. 2 and 3, the fluid resistance element FR includes a stack in which a plurality of thin plates 11 and 12 are stacked, and a resistance flow path RL is formed inside the fluid resistance element FR in a direction intersecting the stacking direction of the stack. The fluid resistance element FR of the present embodiment has a substantially solid-of-revolution shape, a fluid inflow portion FR1 to which the starting end of the resistance flow path RL is open is formed at the central portion of the fluid resistance element FR when viewed from the stacking direction, and the resistance flow path RL extends from the fluid inflow portion FR1 toward the outer peripheral portion.

More specifically, the fluid resistance element FR has a structure in which a slit plate 11 having a substantially circular shape and a slit cover plate 12 having a substantially circular shape are alternately stacked. The slit plate 11 includes a first through hole 11a having a circular shape formed by penetrating the center portion in a thickness direction, and a plurality of slits 11b formed radially from the center portion. The slit cover plate 12 has a second through hole 12a having a circular shape formed by penetrating the center portion in the thickness direction, and has an outer diameter smaller than an outer diameter of the slit plate 11 and an inner diameter greater than an inner diameter of the slit plate 11. By stacking the slit plate 11 and the slit cover plate 12, the resistance flow path RL is formed, the inner-side end portion of the slit 11b serves as an opening at the starting end of the resistance flow path RL, and the outer-side end portion of the slit 11b serves as an opening at a terminal end of the resistance flow path RL. Further, when the slit plate 11 and the slit cover plate 12 are stacked, a through hole penetrating the central portion of the fluid resistance element FR along the stacking direction is formed by the first through hole 11a and the second through hole 12a of the slit plate 11 and the slit cover plate 12, and the through hole serves as the fluid inflow portion FR1.

As illustrated in FIG. 1, the fluid resistance element FR is housed in a third housing portion B3 having a recessed shape formed on an opposing surface Bb (a lower surface in FIG. 1) opposite to the predetermined surface Ba of the block body B. The third housing portion B3 is formed so as to be positioned below the first housing portion B1. The first downstream-side flow path L21 is divided into an upstream-side flow path portion L211 and a downstream-side flow path portion L212 by the third housing portion B3. Here, in the third housing portion B3, one end of the upstream-side flow path portion L211 is open to the bottom surface of the third housing portion B3, and one end of the downstream-side flow path portion L212 is open to the side surface of the third housing portion B3. Further, the upstream-side flow path portion L211 that is open to the bottom surface of the third housing portion B3 communicates with the fluid inflow portion FR1 of the fluid resistance element FR housed in the third housing portion B3. In addition, the fluid having passed through the fluid resistance element FR flows into the downstream-side flow path portion L212 that is open to the side surface of the third housing portion B3.

As illustrated in FIG. 1, the upstream-side pressure sensor PS1 is connected to the upstream side of the fluid resistance element FR in the flow path L, and outputs an output signal corresponding to the upstream-side pressure to the flow rate calculation unit FC. In the configuration of the present embodiment, the upstream-side pressure sensor PS1 detects the upstream-side pressure of the fluid resistance element FR through the through hole that is the fluid inflow portion FR1 of the fluid resistance element FR.

Specifically, the upstream-side pressure sensor PS1 is provided on the opposing surface Bb of the block body B opposite to the predetermined surface Ba. Thus, a fourth housing portion B4 having a recessed shape for installing the upstream-side pressure sensor PS1 is formed on the opposing surface Bb of the block body B, and the fourth housing portion B4 is formed continuously with the third housing portion B3 housing the fluid resistance element FR. That is, the fourth housing portion B4 is formed so as to be positioned below the first housing portion B1, and is configured such that the third housing portion B3 is open to the bottom surface of the fourth housing portion B4. A fixing flange 13 for fixing the upstream-side pressure sensor PS1 to the block body B is attached to the fourth housing portion B4. In the fixing flange 13, a detection communication path 131 for detecting the upstream-side pressure in communication with the through hole that is the fluid inflow portion FR1 of the fluid resistance element FR is formed.

As illustrated in FIG. 1, the downstream-side pressure sensor PS2 is connected to the downstream side of the fluid resistance element FR in the flow path L, and outputs an output signal corresponding to the downstream-side pressure to the flow rate calculation unit FC. The downstream-side pressure sensor PS2 is attached to the predetermined surface Ba of the block body B in one line together with the first fluid control valve V1 and the second fluid control valve V2. The downstream-side pressure sensor PS2 is attached via a fixing flange 14 for fixing the downstream-side pressure sensor PS2 to the block body B. In the fixing flange 14, a detection communication path 141 for detecting the downstream-side pressure in communication with the downstream-side flow path portion L212 of the first downstream-side flow path L21 is formed.

The first fluid control valve V1 is, for example, of a so-called normally open type. Specifically, as illustrated in FIG. 1, the first fluid control valve V1 includes a valve seat component 21 fitted into the first housing portion B1 of the block body B, a valve body 22 provided so as to be movable in a contacting and separating direction with respect to the valve seat component 21, and a valve body driving unit 23 including an actuator that moves the valve body 22, such as a piezoelectric element. Then, the valve body driving unit 23 brings the valve body 22 into contact with and separates the valve body 22 from the valve seat component 21, whereby fluid flows from the upstream-side flow path L1 to the first downstream-side flow path L21 of the downstream-side flow path L2 via an internal flow path 21a formed in the valve seat component 21.

In the present embodiment, since the first housing portion B1, the third housing portion B3, and the fourth housing portion B4 are formed in one line, the first fluid control valve V1, the fluid resistance element FR, and the upstream-side pressure sensor PS1 are disposed in one line in this order along the advancing and retracting direction of the valve body 22 of the first fluid control valve V1.

The second fluid control valve V2 is, for example, of a so-called normally closed type. Specifically, as illustrated in FIG. 1, the second fluid control valve V2 includes a valve seat component 31 fitted into the second housing portion B2 of the block body B, a valve body 32 provided so as to be movable in a contacting and separating direction with respect to the valve seat component 31, and a valve body driving unit 33 including an actuator that moves the valve body 32, such as a piezoelectric element. Then, the valve body driving unit 33 brings the valve body 32 into contact with and separates the valve body 32 from the valve seat component 31, whereby fluid flows from the first downstream-side flow path L21 to the second downstream-side flow path L22 of the downstream-side flow path L2 via an internal flow path 31a formed in the valve seat component 31.

The control unit C feedback-controls a valve opening degree of the first fluid control valve V1 such that the flow rate value calculated by the flow rate calculation unit FC approaches a predetermined flow rate target value. In addition, the control unit C feedback-controls a valve opening degree of the second fluid control valve V2 such that the downstream-side pressure obtained by the downstream-side pressure sensor PS2 approaches a predetermined pressure target value.

<2. Sealing Structure of Fluid Resistance Element FR>

Next, a sealing structure of the fluid resistance element FR in the block body B will be described.

As illustrated in FIG. 3, the fluid resistance element FR is sandwiched and fixed from the stacking direction thereof by the pair of sandwiching components 41 and 42, and sealing components 51 and 52 having a sheet-like shape are provided between the fluid resistance element FR and each of the pair of sandwiching components 41 and 42. That is, the sealing components 51 and 52 having a sheet-like shape are provided between face plate portions (an upper surface FRa and a lower surface FRb) of the fluid resistance element FR and the facing surfaces 41a and 42a of the sandwiching components 41 and 42 corresponding to the face plate portions.

In the configuration of the present embodiment, since the fluid resistance element FR is housed in the third housing portion B3 formed in the block body B, and the fixing flange 13 is fixed to the fourth housing portion B4 formed continuously with the third housing portion B3, the fluid resistance element FR is sandwiched between the block body B and the fixing flange 13. That is, the pair of sandwiching components 41 and 42 of the present embodiment is the block body B and the fixing flange 13. A gap between the block body B and the fixing flange 13 is sealed by, for example, a sealing component 10 made of metal.

The sealing components 51 and 52 are made of a fluorine-based resin and are provided so as to surround the fluid inflow portion FR1 of the fluid resistance element FR. Specifically, the sealing components 51 and 52 have an annular shape in plan view (see FIG. 2). One sealing component 51 seals between the block body B and the fluid resistance element FR, between the through hole that is the fluid inflow portion FR1 (the starting end of the resistance flow path RL), and the outer peripheral portion of the fluid resistance element FR (the terminal end of the resistance flow path RL). The other sealing component 52 seals between the fixing flange 13 and the fluid resistance element FR, between the through hole that is the fluid inflow portion FR1 (the starting end of the resistance flow path RL), and the outer peripheral portion of the fluid resistance element FR (the terminal end of the resistance flow path RL).

Protrusions 61 and 62 that partially press the sealing components 51 and 52 are respectively formed on the facing surfaces 41a and 42a of the pair of sandwiching components 41 and 42. The protrusions 61 and 62 are each formed so as to surround the fluid inflow portion FR1, and in the present embodiment, is one ridge having an annular shape formed so as to surround the fluid inflow portion FR1. The cross-sectional shapes of the protrusions 61 and 62 are, for example, rectangular. Further, the protrusion 61 formed on one sandwiching component 41 (the block body B) and the protrusion 62 formed on the other sandwiching component 42 (the fixing flange 13) are formed at positions opposite to each other. As a result, a bending moment is hardly applied to the fluid resistance element FR that is sandwiched, and the fluid resistance element FR is hardly deformed. Note that the protrusion 61 formed on one sandwiching component 41 and the protrusion 62 formed on the other sandwiching component 42 may not be formed at positions opposite to each other.

<Effects of Present Embodiment>

According to the fluid control device MFC of the present embodiment configured as described above, since the protrusions 61 and 62 that partially press the sealing components 51 and 52 are respectively formed on the pair of sandwiching components 41 and 42, the sealing performance between each of the pair of sandwiching components 41 and 42 and the fluid resistance element FR can be improved by the protrusions 61 and 62 biting into the sealing components 51 and 52. Further, since the sealing components 51 and 52 are partially pressed by the protrusions 61 and 62, a load applied to the fluid resistance element FR can be reduced, and a change in the flow rate characteristic due to deformation of the fluid resistance element FR can be suppressed.

In addition, since each of the protrusions 61 and 62 of the present embodiment is one ridge having an annular shape formed so as to surround the fluid inflow portion FR1, the sealing performance can be improved while preventing contamination caused by gas remaining between the protrusions 61 and 62 in a case where a plurality of ridges are provided.

<Other Embodiments>

Figure 4:
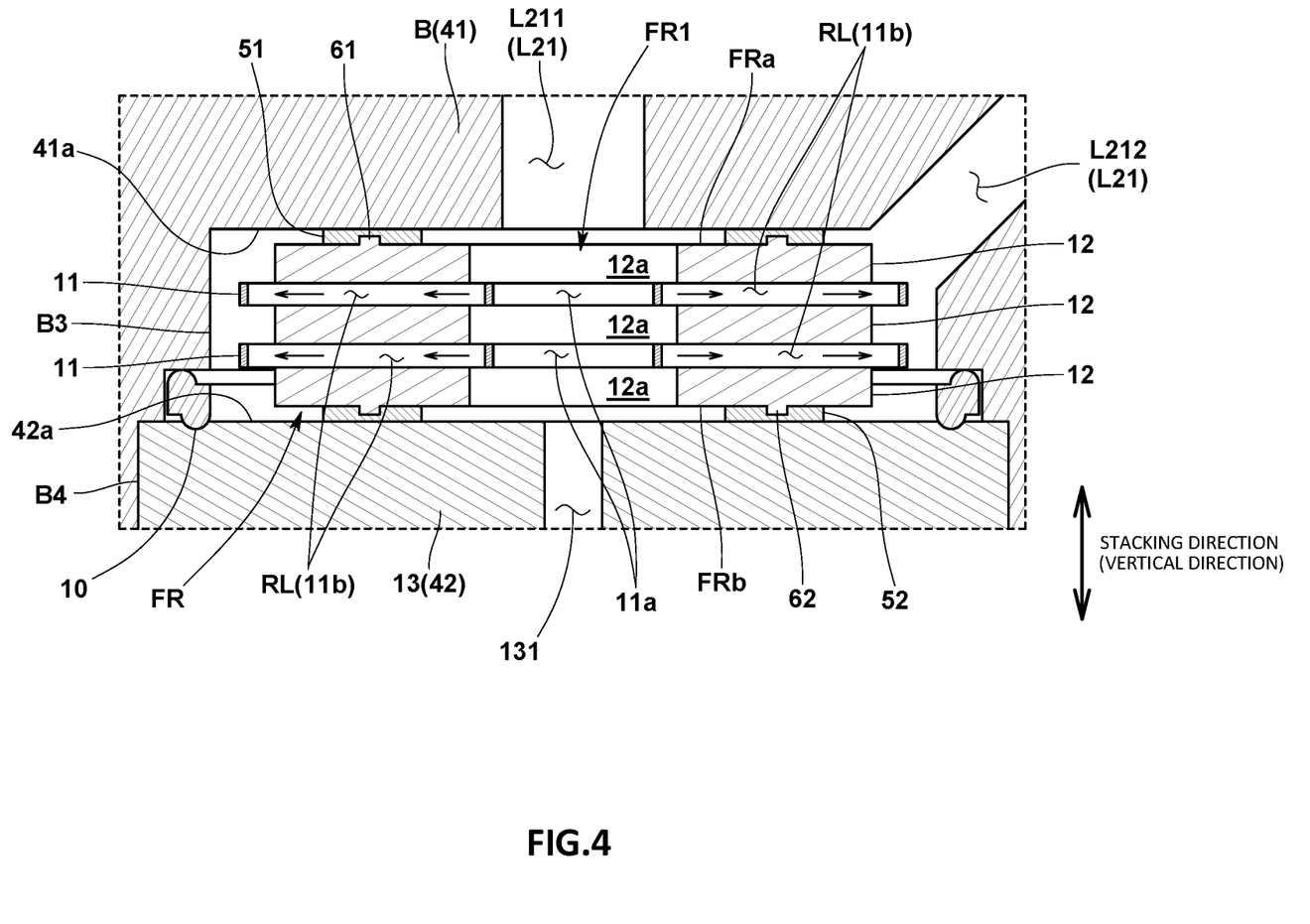
FIG. 4 is a partially enlarged cross-sectional view illustrating details of a sealing structure of a fluid resistance element according to a modified embodiment.

In the above embodiment, the protrusions 61 and 62 are respectively provided on the pair of sandwiching components 41 and 42. However, as illustrated in FIG. 4, the protrusions 61 and 62 may be provided, for example, on the face plate portions FRa and FRb of the fluid resistance element FR, other than the configuration in which the protrusions 61 and 62 are provided on the facing surfaces 41a and 42a of the sandwiching components 41 and 42. Further, the protrusions 61 and 62 may be provided on both of the facing surfaces 41a and 42a of the sandwiching components 41 and 42 and the face plate portions FRa and FRb of the fluid resistance element FR.

Figure 5:
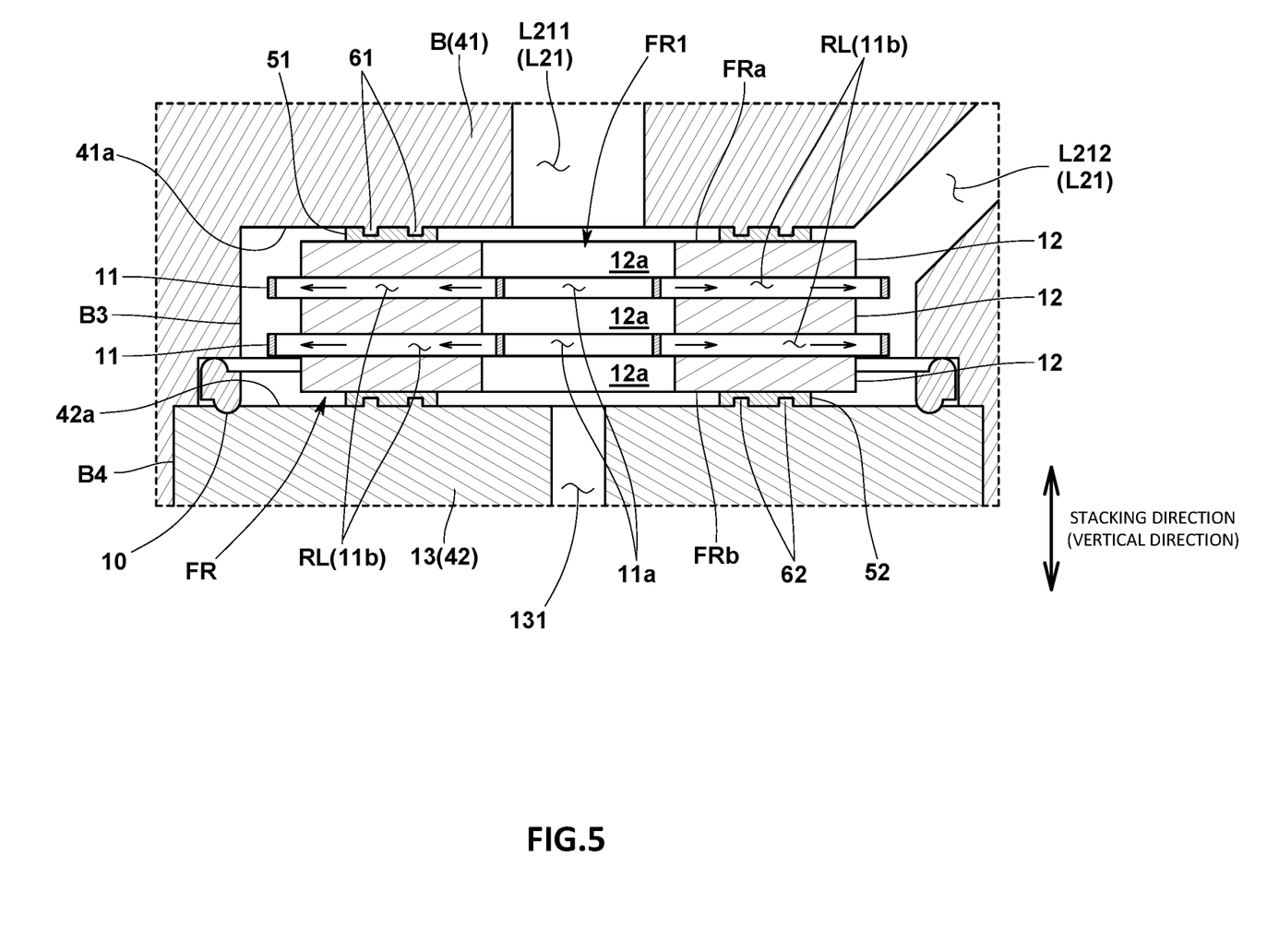
FIG. 5 is a partially enlarged cross-sectional view illustrating details of a sealing structure of a fluid resistance element according to a modified embodiment.

In addition, in the above embodiment, the protrusions 61 and 62 are each configured by one ridge, but as illustrated in FIG. 5, the protrusions 61 and 62 may be each configured by a plurality of ridges concentrically formed around the fluid inflow portion FR1. With this configuration, the sealing performance can be improved as compared with the case where the protrusions 61 and 62 are each configured by one ridge.

Moreover, in the above embodiment, the cross-sectional shapes of the protrusions 61 and 62 are rectangular, but the cross-sectional shape may be trapezoidal, or the tip thereof may be partially circular.

Furthermore, in the above embodiment, the fluid resistance element FR is sandwiched between the block body B and the fixing flange 13 of the upstream-side pressure sensor PS1, but the fluid resistance element FR may be sandwiched using another component. In this case, the fluid resistance element FR sandwiched using another component is disposed on the flow path L.

Further, in the above embodiment, the fluid inflow portion FR1 of the fluid resistance element FR is the through hole, but the fluid resistance element FR may have a bottom plate having no through hole, and the fluid inflow portion FR1 may have a structure including a bottom. In this case, the upstream-side pressure sensor PS1 is connected to the upstream side of the fluid resistance element FR in the flow path L and detects the upstream-side pressure.

Still further, in the configuration of the above embodiment, the first fluid control valve V1 and the second fluid control valve V2 are included, but the flow rate may be controlled by the first fluid control valve V1 without including the second fluid control valve V2.

Additionally, in the configuration of the above embodiment, the pair of sandwiching components 41 and 42 are respectively provided with the protrusions 61 and 62, but the protrusion may be provided only on one of the pair of sandwiching components. In this case, the other of the pair of sandwiching components is configured to press the sealing component by the face plate portion of the fluid resistance element and the face plate portion of the sandwiching component.

In the above embodiment, the first fluid control valve V1 is of a normally open type, but may be of a normally closed type, and the second fluid control valve V2 is of a normally closed type, but may be of a normally open type.

The fluid resistance element of the above embodiment has a substantially solid-of-revolution shape. However, the fluid resistance element may have a substantially rectangular parallelepiped shape, and may have a configuration in which a fluid inflow portion FR1 to which the starting end of the resistance flow path RL is open is formed at the central portion in the longitudinal direction of the fluid resistance element when viewed from the stacking direction and the resistance flow path RL extends from the fluid inflow portion FR1 toward both sides in the longitudinal direction.

The fluid control device incorporating the pressure type flowmeter has been described in the above embodiment, but the present invention can also be applied to a single pressure type flowmeter.

In addition, various modifications and combinations of the embodiments may be made unless such modification or combination departs from the spirit or scope of the present invention.

LIST OF REFERENCE CHARACTERS

MFC fluid control device
L flow path

L211 upstream-side flow path portion (upstream-side flow path communicating with through hole)
RL resistance flow path
FR fluid resistance element
PS1 upstream-side pressure sensor
PS2 downstream-side pressure sensor
51, 52 sealing component
61, 62 protrusion
FR1 fluid inflow portion
B (41) block body (sandwiching component)
131 detection communication path
13 (42) fixing flange (sandwiching component)
V1 fluid control valve (first fluid control valve)
22 valve body

What is claimed is:

1. A pressure type flowmeter comprising:
a fluid resistance element that is provided in a flow path through which fluid flows, and in which a resistance flow path communicating with the flow path is formed;
an upstream-side pressure sensor configured to detect upstream-side pressure of the fluid resistance element; and
a downstream-side pressure sensor configured to detect downstream-side pressure of the fluid resistance element,
wherein the fluid resistance element is sandwiched and fixed by a pair of sandwiching components,
a sealing component having a sheet-like shape is provided between the fluid resistance element and the pair of sandwiching components, and
a protrusion that partially presses the sealing component is formed on at least one of the fluid resistance element and the pair of sandwiching components.

2. The pressure type flowmeter according to claim 1, wherein
the fluid resistance element includes a stack, in which the resistance flow path is formed in a direction intersecting a stacking direction of the stack, and
the pair of sandwiching components are configured to sandwich and fix the fluid resistance element from the stacking direction.

3. The pressure type flowmeter according to claim 2, wherein
in the fluid resistance element, a fluid inflow portion to which a starting end of the resistance flow path is open is formed in a central portion of the fluid resistance element when viewed from the stacking direction, and the resistance flow path extends from the fluid inflow portion toward an outer peripheral portion,
the sealing component is provided so as to surround the fluid inflow portion, and
the protrusion is formed so as to surround the fluid inflow portion.

4. The pressure type flowmeter according to claim 3, wherein the protrusion is one ridge having an annular shape formed so as to surround the fluid inflow portion.

5. The pressure type flowmeter according to claim 3, wherein
the fluid inflow portion of the fluid resistance element is a through hole penetrating the fluid resistance element along the stacking direction,
the upstream-side pressure sensor detects upstream-side pressure of the fluid resistance element through the through hole, and
the pair of sandwiching components includes:
a block body in which an upstream-side flow path communicating with the through hole is formed; and
a fixing flange by which the upstream-side pressure sensor is fixed to the block body, and in which a detection communication path configured to detect pressure in communication with the through hole is formed.

6. A fluid control device comprising:
the pressure type flowmeter according to claim 5; and
a fluid control valve provided on an upstream side of the pressure type flowmeter,
wherein in the block body, the fluid control valve, the fluid resistance element, and the upstream-side pressure sensor are disposed in this order in one line along an advancing and retracting direction of a valve body of the fluid control valve.

7. The pressure type flowmeter according to claim 1, wherein
the sealing component is provided between the fluid resistance element and each of the pair of sandwiching components, and
the protrusion is formed on each of the pair of sandwiching components.

8. The pressure type flowmeter according to claim 1, wherein the sealing component is made of a fluorine-based resin.

9. A fluid control device comprising:
the pressure type flowmeter according to claim 1; and
a fluid control valve provided on an upstream side or a downstream side of the pressure type flowmeter.

* * * * *